United States Patent Office 3,123,584
Patented Mar. 3, 1964

3,123,584
BLEND OF A COPOLYMER OF ALPHA-METHYL-STYRENE AND ACRYLONITRILE AND A COPOLYMER OF BUTADIENE, ACRYLONITRILE, AND STYRENE OR ALPHA-METHYLSTYRENE AND INJECTION MOULDED ARTICLES THEREOF
André Fournet and André Rio, Lyons, France, assignors to Societe des Usines Chimiques Rhone-Poulenc, Paris, France, a body corporate of France
No Drawing. Filed Feb. 4, 1960, Ser. No. 6,610
Claims priority, application France Feb. 19, 1959
2 Claims. (Cl. 260—45.5)

This invention relates to thermoplastic compositions and particularly to thermoplastic compositions of valuable properties, especially as regards shock-resistance, which contain a mixture of copolymers including a copolymer based on alpha-methylstyrene.

Alpha-methylstyrene alone polymerises with difficulty but it can be readily polymerised in the presence of acrylonitrile. However, the copolymers obtained are hard and brittle. It is known to impart better shock resistance to polystyrene, which is also hard and brittle, by incorporating therein a proportion of elastomers such as polybutadiene or elastomeric copolymers of butadiene with another ethylenic substance, such as acrylonitrile or styrene.

If it is attempted to incorporate polybutadiene in alpha-methylstyrene acrylonitrile copolymers, it is found that the two copolymers are incompatible, so that the mixture is rendered non-homogeneous and technically unusable. The same incompatibility is observed when elastomeric butadiene styrene copolymers are admixed with alpha-methylstyrene/acrylonitrile copolymers. Elastomeric butadiene/acrylonitrile copolymers are compatible with alpha-methylstyrene/acrylonitrile copolymers, but the mixtures obtained lack plasticity and fluidity at the temperatures at which they are employed, for example in injection presses, which constitutes a serious disadvantage in their use. Further, ternary copolymers of butadiene, acrylonitrile and styrene (or α-methylstyrene) are known but these products lack hardness and are not shock-resistant.

It has now been found that compositions based on alpha-methylstyrene/acrylonitrile copolymers which are remarkably shock-resistant, which resist a temperature of the order of 100° C. without appreciable deformation, and which are completely homogeneous, may be obtained by including in the composition a ternary elastomeric copolymer of butadiene, acrylonitrile, and styrene or alpha-methylstyrene.

According to the present invention there are provided rigid shock-resistant thermoplastic compositions consisting of a mixture of (I) 85 to 70 parts by weight of a rigid copolymer itself consisting of 90 to 70 parts by weight of alpha-methylstyrene and 10 to 30 parts by weight of acrylonitrile, with (II) 15 to 30 parts by weight of a ternary elastic copolymer composed of butadiene, acrylonitrile, and styrene or alpha-methylstyrene, there being present in said ternary elastic copolymer 50 to 80 parts by weight of butadiene and 50 to 20 parts by weight of the said other copolymerised substances, the relative proportion of acrylonitrile to styrene or alpha-methylstyrene being as 20 to 60 parts by weight of acrylonitrile to 80 to 40 parts by weight of styrene or alpha-methylstyrene.

The aforesaid copolymers may be obtained by the conventional methods, for example by emulsion copolymerisation with catalysts of the free radical type. It is useful to adjust the viscosity of the copolymers by means of chain-limiting agents, such as halogen or sulphur derivatives. Ternary copolymers of butadiene, acrylonitrile and styrene or α-methylstyrene are disclosed for example in United States Patents Nos. 2,384,547, 2,527,162 and French Patent No. 1,140,884 and these specifications describe methods for their production.

The compositions may be obtained by mixing the copolymers by mechanical means, such as rolling or extrusion or, preferably, by mixing aqueous emulsions of the copolymers and then coagulating them, drying them, and thereafter homogenising them by rolling or extrusion.

The following examples will serve to illustrate the invention:

Example 1

A rigid alpha-methylstyrene/acrylonitrile copolymer was prepared in emulsion by agitating the following mixture for 16 hours at 55° C. in an inert atmosphere:

Alpha-methylstyrene _____ g__ 80
Acrylonitrile _____ g__ 20
Lauryl mercaptan _____ g__ 0.5
Water _____ cc__ 300
Dioctyl ester of sodium sulphosuccinic acid (emulsifying agent) _____ g__ 0.6
Potassium persulphate _____ g__ 1

A copolymer was obtained, of which a 2% solution in dimethylformamide had a specific viscosity at 20° C. in the neighbourhood of 0.1.

Further, an elastomeric butadiene-alpha-methylstyrene/acrylonitrile copolymer was prepared from the following mixture agitated for 16 hours at 40° C. in an inert atmosphere:

Butadiene _____ g__ 70
Alpha-methylstyrene _____ g__ 18
Acrylonitrile _____ g__ 12
Lauryl mercaptan _____ g__ 0.1
Potassium stearate _____ g__ 1
Water _____ cc__ 200
Potassium persulphate _____ g__ 1

The content of dry matter in each latex was determined. The lattices were so mixed that there were 75% of rigid copolymer and 25% of elastomeric copolymer calculated on the dry substance. The mixture was coagulated, washed and dried, and the product was shaped by extrusion at about 200° C. and then injection moulded at a temperature of at least 210° C. The following properties were measured on the injected articles.

Modulus of elasticity _____ 170 kg./mm.$^2$.
Brinell hardness _____ 8 kg./mm.$^2$.
Breaking energy:
    (Direction parallel to the
        injection) _____ 47.5 kg. cm./cm.$^2$.
    (Direction perpendicular to the
        injection) _____ 43 kg. cm./cm.$^2$.

Flexural strength:
  (Parallel direction) _____ 5.9 kg./mm.$^2$.
  (Perpendicular direction) _____ 4.2 kg./mm.$^2$.
Breaking angle:
  (Parallel direction) _____ >90°.
  (Perpendicular direction) _____ 48°.

*Example II*

80 parts of the rigid copolymer prepared in accordance with Example I, and 20 parts of elastomeric copolymer, also prepared in accordance with Example I were mixed.

The mixture obtained was injection moulded under the same conditions and the products had the following properties:

Modulus of elasticity _____ 195 kg./mm.$^2$.
Brinell hardness _____ 8.8 kg./mm.$^2$.
Breaking energy:
  (Direction parallel to the
    injection) _____ 52.5 kg. cm./cm.$^2$.
  (Direction perpendicular to the
    injection) _____ 36 kg. cm./cm.$^2$.
Flexural strength:
  (Parallel direction) _____ 7.4 kg./mm.$^2$.
  (Perpendicular direction) _____ 4.4 kg./mm.$^2$.
Breaking angle:
  (Parallel direction) _____ >90°.
  (Perpendicular direction) _____ 31°.

*Example III*

The procedure of Example I was followed but, in the preparation of the elastomeric copolymer, alpha-methylstyrene was replaced by an equal quantity of styrene.

A mixture was prepared which contained 25% of the said elastomer and 75% of alpha-methylstyrene/acrylonitrile copolymer prepared in accordance with Example I. The properties of the products, injection moulded at a temperature of at least 203° C., are indicated in the first column of the following table. The second column indicates the values for an alpha-methylstyrene/acrylonitrile copolymer (80:20) containing no elastomeric copolymer.

|  | 1 | 2 |
|---|---|---|
| Degrees Martens | 97 | 109 |
| Modulus of elasticity at 23° C _____ kg./mm$^2$ | 170 | 300 |
| Modulus of elasticity at 63° C _____ kg./mm$^2$ | 80 | 250 |
| Brinell hardness _____ kg./mm$^2$ | 9.3 | 22.6 |
| Rockwell hardness (scale R) | 91 | 125 |
| Tensile strength _____ kg./mm$^2$ | 3.5 | 7.4 |
| Breaking elongation _____ percent | 17 | 7 |
| Breaking energy: |  |  |
|   (Parallel direction) _____ kg. cm./cm$^2$ | 57 | 20 |
|   (Perpendicular direction) _____ kg. cm./cm$^2$ | 57 | 5 |
| Flexural strength: |  |  |
|   (Parallel direction) _____ kg./mm$^2$ | 5.7 | 9.1 |
|   (Perpendicular direction) _____ kg./mm$^2$ | 4.8 | 4.1 |
| Breaking angle: |  |  |
|   (Parallel direction) _____ degrees | 78 | 21 |
|   (Perpendicular direction) | 60 | 9 |

The breaking energy, flexural strength and breaking angle referred to above are determined according to the German Standard DIN 53,453, using a Dynstat test machine; this machine is the equivalent of Charpy and Izod machines used for measuring impact strength according to the ASTM standard D256.

We claim:

1. A shock-resistant thermoplastic composition consisting of a mixture of (I) 85 to 70 parts by weight of a rigid copolymer of 90–70 parts by weight of alpha-methylstyrene and 10 to 30 parts by weight of acrylonitrile, and (II) 15 to 30 parts by weight of a ternary elastic copolymer of 50–80 parts by weight of butadiene, 4 to 30 parts by weight of acrylonitrile and 8 to 40 parts by weight of a substance selected from the class consisting of styrene and α-methylstyrene.

2. Injection moulded articles formed of a composition as claimed in claim 1.

References Cited in the file of this patent

UNITED STATES PATENTS

| 2,439,202 | Daly _____ Apr. 6, 1948 |
| 2,538,779 | Harrison et al. _____ Jan. 23, 1951 |
| 2,597,087 | Cowgill _____ May 20, 1952 |
| 2,614,093 | Wheelock _____ Oct. 14, 1952 |
| 2,791,571 | Wheelock et al. _____ May 7, 1957 |
| 2,980,640 | Shoemaker et al. _____ Apr. 18, 1961 |